May 1, 1962     H. ZIMA     3,032,582
PROCESS FOR THE PRODUCTION OF CYANOGEN AND CYANIC ACID
BY OXIDATION OF HYDROGEN CYANIDE AND THE PREPARATION
OF URETHANES AND ALLOPHANIC ACID ESTERS THEREFROM
Filed May 12, 1958
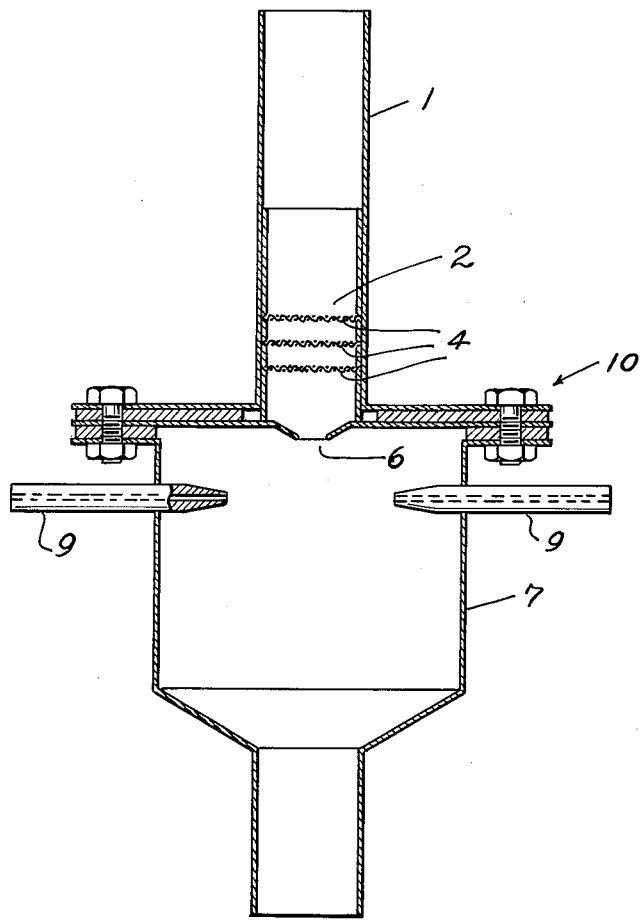
INVENTOR
Herbert Zima
BY
Curtis Morris + Safford
ATTORNEYS United States Patent Office 3,032,582
Patented May 1, 1962

3,032,582
PROCESS FOR THE PRODUCTION OF CYANOGEN AND CYANIC ACID BY OXIDATION OF HYDROGEN CYANIDE AND THE PREPARATION OF URETHANES AND ALLOPHANIC ACID ESTERS THEREFROM
Herbert Zima, Darmstadt, Germany, assignor to Rohm & Haas G.m.b.H., Darmstadt, Germany
Filed May 12, 1958, Ser. No. 734,726
Claims priority, application Germany May 15, 1957
10 Claims. (Cl. 260—482)

This invention relates to an improved method for oxidizing hydrogen cyanide.

It is well known that hydrogen cyanide can be oxidized upon contact with air or other oxygen-containing gas. The products of such oxidation are cyanogen, cyanuric acid, cyamelide, melamine, urea and even nitrogen oxides, depending upon the catalyst employed, the ratio of hydrogen cyanide to oxygen, the speed of flow and the temperature involved. The method of the present invention is not concerned with such complete oxidations as those involved in the formation of nitrogen oxides but primarily with the preparation of cyanogen and cyanic acid as well as the preparation of secondary reaction products derived from the cyanogen and cyanic acid.

The oxidation of hydrogen cyanide is believed to take place in accordance with the following reactions:

(I) $2HCN + \frac{1}{2}O_2 \rightarrow (CN)_2 + H_2O$
(II) $HCN + \frac{1}{2}O_2 \rightarrow HCNO$ A technically feasible method for oxidizing hydrogen cyanide to cyanogen in accordance with Reaction I has heretofore been proposed. It comprises bringing hydrogen cyanide into contact with air in the presence of a metallic silver catalyst at temperatures ranging from about 300 to about 600° C. Unfortunately, however, the yields obtainable by means of this process are reported to be a maximum of about 22.8%, which leaves much to be desired from the point of view of commercial operation. This low yield is believed to be due to the fact that a considerable number of solid by-products of varying composition are formed, especially during continuous operation. Such solid materials include polymerization products of cyanic acid, urea and ammonium cyanate which collect in the apparatus, interfere with its operation, have no practical utility, and contribute to the formation of other undesirable by-products and in general add considerably to the expense of the method and the cost of the apparatus. An efficient method of industrial utility for producing cyanic acid as indicated in Reaction II is not known to have been described.

It has now been found that oxidation of hydrogen cyanide will proceed smoothly, with excellent yields of cyanic acid and cyanogen, by bringing it into contact with oxygen at an elevated temperature and in the presence of a catalyst comprising metallic gold.

The catalyst is preferably in the form of a fine wire mesh or a porous carrier upon which gold has been precipitated in a finely divided form. It is also within the scope of the invention to employ, as catalyst, combinations of metallic gold with other catalytically active metals such as copper and silver.

The temperature conditions of the reaction are desirably within the range of about 300 to 700° C., a somewhat narrower range between about 500 and 650° C. being preferred for optimum results. One or both the gases to be reacted may desirably be preheated and the catalyst may also be heated, e.g., electrically, to produce the desired elevated temperature and initiate the oxidation.

The relative proportions of oxygen-containing gas, e.g., air, and hydrogen cyanide are dependent upon the identity of the product primarily desired. For the preparation of cyanogen, the mol ratio of oxygen to hydrogen cyanide should be at least 1:4, as indicated in Reaction I, whereas for the preparation primarily of cyanic acid, the mol ratio should be increased to at least 1:2, as indicated in Reaction II.

Whereas cyanogen is a relatively stable compound, even at high temperatures, cyanic acid polymerizes readily to form cyanuric acid or cyamelide or undergoes other conversions. Such polymerization or other conversions, which are generally considered undesirable, are preferably inhibited by rapidly cooling the gaseous reaction products immediately after they are formed in the catalytic reaction zone.

The rapid cooling of the reaction gases immediately after they leave the catalytic reaction zone can be accomplished in any desired manner or combination of ways. One means of rapid cooling is that of imparting a high velocity, and therefore reduced pressure, to the reaction gases immediately upon leaving the catalytic reaction zone and then directing the gases to an adjacent cooling chamber. Another means is that of injecting into the stream of reaction gases, immediately upon their departure from the catalytic reaction zone, a cooling fluid which may be inert to the reaction gases or be capable of reacting with them to form one or more preselected derivatives. This may be accomplished by spraying a precooled liquid or blowing a precooled or compressed gas into the gaseous reaction product stream. Thus, for example, a rapid chilling can be effected by blowing into the hot reaction gases a precooled and possibly compressed stream of precooled nitrogen. On the other hand, a rapid chilling and simultaneous desired secondary reaction may be achieved by spraying into the hot reaction gases a precooled alcohol which will not only effect the desired cooling of the reaction gases but react with them to produce a urethane and/or an allophanic acid ester. It has been shown to be particularly desirable, when the process is directed primarily to the production of cyanogen and/or cyanic acid, to inhibit the formation of unwanted by-products of hydrogen cyanide oxidation by effecting the chilling with the aid of precooled gases that are inert to the products of reaction and are blown into the gaseous stream thereof. While it is to be understood that the temperature to which the reaction gases are to be cooled in accordance with the method of the invention depends upon the particular products desired and the yield required, and that the temperature may therefore vary widely, it has been found generally desirable to cool the gases immediately after leaving the reaction zone to a temperature of approximately 0° C.

The separation of cyanogen and/or cyanic acid, or of their derivatives, can readily be carried out in known manner, e.g., by washing, crystallization, or otherwise, most desirably in an absorption tower having a suitable fluid such as an alcohol or chloroform circulated therethrough. It is to be understood of course that when chloroform is employed the absorption tower must be suitably cooled.

A typical embodiment of the apparatus of the invention is shown in the accompanying drawing. The embodiment illustrated comprises a tubular section 1 containing a catalytic reaction zone 2 provided with a wire mesh catalyst 4 and having a restricted exit opening 6 leading to a chilling chamber 7 of substantially greater cross section than the catalytic reaction zone 2. The chamber 7 is shown as provided with two injection nozzles 9 and as being connected to the catalytic reaction zone by a suitably flanged and packed connection shown generally at 10.

In operation, the hydrogen cyanide and air or other oxygen-containing gas is introduced through the tube 1 to the catalytic reaction zone 2 wherein, upon contact with the catalyst 4 at an elevated temperature, the hydrogen cyanide is converted into the desired oxidation products. The movement of the reaction gases is accelerated by passage through the restricted opening or orifice 6 whereupon they enter the chilling chamber 7 in which they are further rapidly cooled by contact with a precooled fluid injected by means of the nozzles 9.

The advantages and utility as well as further details of the operation of applicant's method will become further apparent from the following example included to illustrate the best mode now contemplated of carrying out the invention.

*Example*

A mixture of 32.6 l.p.h. (liters per hour) air and 12.9 l.p.h. hydrogen cyanide was fed through reactor tube 1 of vanadium alloy steel for contact at 630 to 640° C. with three electrically heated gold wire mesh screens 4 in which the diameter of the wire was 0.2 mm. and the width of the mesh was 0.5 mm. The screens had diameters of 20 mm. and were spaced 5 mm. apart. The gaseous products of reaction were chilled to about 0° C. by blowing in nitrogen cooled to a temperature of about −150° C. and then passed through an absorption tower (not shown) containing alcohol.

It was found that 86% of the hydrogen cyanide had been oxidized; the yields of cyanic acid, cyanogen and $CO_2$ were 56%, 1% and 37%, respectively, based on the hydrogen cyanide consumed.

It is to be understood that numerous modifications will readily become apparent to those skilled in the art upon readily this description. All such modifications are intended to be included within the scope of the invention as defined in the appended claims.

I claim:

1. A method of oxidizing hydrogen cyanide which comprises bringing it into contact with oxygen at a temperature between about 300° and 700° C. in the presence of an oxidation catalyst comprising metallic gold.

2. Method as defined in claim 1 wherein the catalyst comprises metallic gold wire mesh.

3. Method as defined in claim 1 wherein the catalyst comprises metallic gold on a porous carrier.

4. A method of oxidizing hydrogen cyanide which comprises bringing it into contact with oxygen at a temperature between about 300° and 700° C. in a catalytic zone containing metallic gold and rapidly cooling the reaction products of said oxidation immediately after their removal from the catalytic zone.

5. Method as defined in claim 4 wherein the oxidation products are chilled to a temperature of approximately 0° C.

6. Method as defined in claim 4 wherein the rapid cooling of the oxidation products is effected by injecting a precooled fluid into a stream of said products upon departure from the catalytic zone.

7. Method as defined in claim 6 wherein the precooled fluid is a liquid.

8. Method as defined in claim 6 wherein the precooled fluid is a gas.

9. A method for preparing cyanic acid which comprises oxidizing hydrogen cyanide with at least a stoichiometric amount of oxygen by contact thereof at a temperature between about 300° and 700° C. with a catalyst comprising metallic gold.

10. In the method of making urethanes and allophanic acid esters by reacting cyanic acid and cyanogen with an alcohol, the improvement of continuously forming cyanic acid and cyanogen by continuously contacting hydrogen cyanide with oxygen at a temperature between about 300° and 700° C. in the presence of an oxidation catalyst comprising metallic gold, and then cooling the gases thus formed by injection thereinto of a precooled alcohol to be reacted therewith.

References Cited in the file of this patent

UNITED STATES PATENTS

| | | |
|---|---|---|
| 2,143,371 | Francon | Jan. 10, 1939 |
| 2,712,493 | Moje | July 5, 1955 |
| 2,723,185 | Huemer | Nov. 8, 1955 |
| 2,884,308 | Fierce et al. | Apr. 28, 1959 |
| 2,916,534 | Schnallus et al. | Dec. 8, 1959 |

OTHER REFERENCES

Blohm et al.: "Allophanates," Chemical Reviews, vol. 51, 1952, page 472.